(12) United States Patent
Abdullah et al.

(10) Patent No.: US 11,221,346 B2
(45) Date of Patent: Jan. 11, 2022

(54) ICE PREVENTION DAM FOR, AND METHOD FOR FORMING, A PITOT TUBE

(71) Applicant: Honeywell International Inc., Morris Plains, NJ (US)

(72) Inventors: Sadique Mohammad Abdullah, Bangalore (IN); Purushotham Reddy B., Hyderabad (IN); Narasimha Reddy Venkatarayappa, Bangalore (IN); Murali Krishnan Payangapadan, Bangalore (IN); Eswara Naidu Chikkala, Bangalore (IN); Rama Sateesh Venkata Kandula, Visakhapatnam (IN)

(73) Assignee: Honeywell International Inc., Charlotte, NC (US)

( * ) Notice: Subject to any disclaimer, the term of this patent is extended or adjusted under 35 U.S.C. 154(b) by 418 days.

(21) Appl. No.: 15/457,416

(22) Filed: Mar. 13, 2017

(65) Prior Publication Data

US 2018/0259547 A1    Sep. 13, 2018

(51) Int. Cl.
*G01P 5/165* (2006.01)
(52) U.S. Cl.
CPC .................... *G01P 5/165* (2013.01)
(58) Field of Classification Search
CPC ....................................................... G01P 5/165
(Continued)

(56) References Cited

U.S. PATENT DOCUMENTS 1,844,046 A * 2/1932 Sheets ................... F16K 5/0407
                                                                                251/301
2,984,107 A   5/1961 Strieby et al.
(Continued)

FOREIGN PATENT DOCUMENTS

CN     1249037 A    3/2000
CN   103995145 A    8/2014
(Continued)

OTHER PUBLICATIONS

European Patent Office; "Extended European Search Report from EP Application No. 18160830.8 dated Jun. 22, 2018" from Foreign Counterpart of U.S. Appl. No. 15/457,416; pp. 1-9; dated Jun. 22, 2018; Published: EP.

(Continued)

*Primary Examiner* — Robert R Raevis
(74) *Attorney, Agent, or Firm* — Fogg & Powers LLC

(57) ABSTRACT

In an embodiment, an ice-prevention dam for a pitot tube includes a body and a head. The body includes a notch having a substantially planar back, and the head extends from the body and has a substantially planar side that is substantially parallel to the back of the notch. Such a dam can prevent ice accumulation in a pitot tube, and can facilitate proper positioning of the dam. For example, during manufacture of a pitot tube, an assembler inserts the dam into a hole in a side of a pitot-tube body having a front opening such that the head of the dam is located outside of the pitot-tube body and a body of the dam is located inside of the pitot-tube body. Next, the assembler positions the dam by causing the substantially planar side of the dam head to be substantially parallel with the front opening of the pitot-tube body.

15 Claims, 7 Drawing Sheets

(58) Field of Classification Search
USPC ............... 73/861.65–861.68, 178 R, 502; 251/298–301
See application file for complete search history.

(56) References Cited

U.S. PATENT DOCUMENTS

| | | | |
|---|---|---|---|
| 3,163,040 A | | 12/1964 | Werner |
| 3,383,916 A | * | 5/1968 | Werner .................. G01P 5/165 73/861.68 |
| 3,831,448 A | * | 8/1974 | Kors ........................ G01F 1/375 73/747 |
| 4,240,322 A | | 12/1980 | Teske |
| 4,393,692 A | * | 7/1983 | Clark ...................... G01P 5/165 73/112.01 |
| 4,863,144 A | * | 9/1989 | Wilson ................... F16K 27/065 251/317.01 |
| 5,601,254 A | | 2/1997 | Ortiz et al. |
| 6,070,475 A | | 6/2000 | Muehlhauser et al. |
| 6,892,584 B2 | | 5/2005 | Gilkison et al. |
| 6,902,145 B2 | * | 6/2005 | Latzer ...................... F16K 3/06 251/170 |
| 9,207,253 B2 | | 12/2015 | Seidel et al. |
| 2014/0116154 A1 | | 5/2014 | Seidel et al. |
| 2016/0280391 A1 | | 9/2016 | Golly et al. |

FOREIGN PATENT DOCUMENTS

| | | |
|---|---|---|
| CN | 104088704 A | 10/2014 |
| GB | 779754 A | 7/1957 |
| GB | 867675 A | 5/1961 |
| KR | 20120066378 A | 6/2012 |

OTHER PUBLICATIONS

"3170-Pro-Kit Counter Snap Pro Kit", "retrived on Sep. 13, 2016 from http://www.mysqueakyfloors.com/Item/hardwood-Floors/Counter_Snap_Pro_Kit", Sep. 13, 2016, pp. 1-7, Publisher: MySqueakyFloors.com.

European Patent Office, "Communication pursuant to Article 94(3) from EP Application No. 18160830.8 dated May 3, 2019", from Foreign Application No. 15/457,416, pp. 1-4, Published: EP.

European Patent Office, "Communication pursuant to Article 94(3) from EP Application No. 18160830.8", from Foreign Counterpart to U.S. Appl. No. 15/457,416, dated Feb. 20, 2020, pp. 1-5, Published: EP.

National Intellectual Property Administration, P.R. China, "First Office Action from CN Application No. 201810200305.5", from Foreign Counterpart to U.S. Appl. No. 15/457,416, dated May 21, 2021, pp. 1 through 17, Published: CN.

* cited by examiner

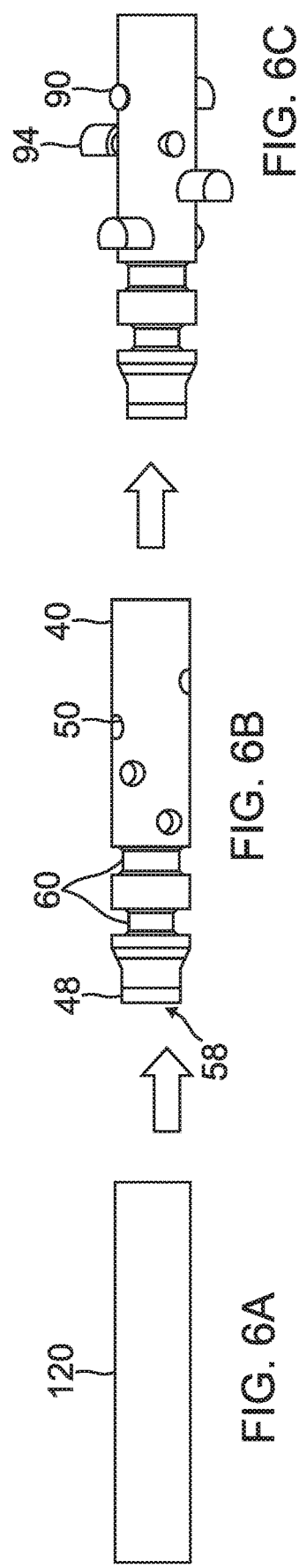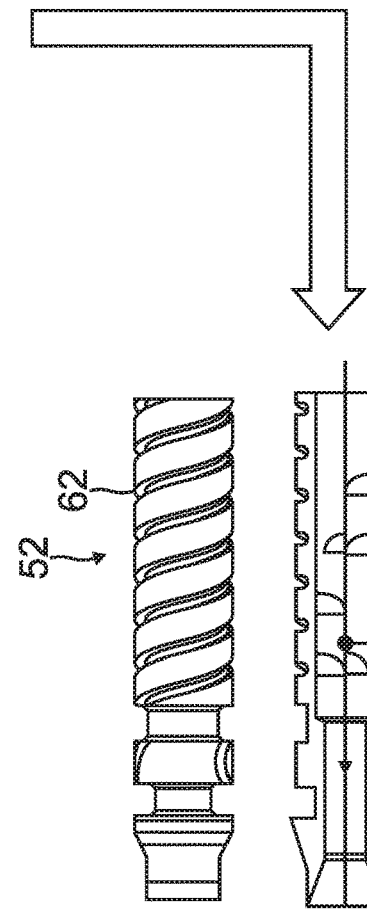

ICE PREVENTION DAM FOR, AND METHOD FOR FORMING, A PITOT TUBE

SUMMARY

In an embodiment, an ice-prevention dam for a pitot tube includes a body and a head. The body includes a notch having a substantially planar back, and the head extends from the body and has a substantially planar side that is substantially parallel to the substantially planar back of the notch. Such a dam can facilitate preventing ice buildup in a pitot tube, and can facilitate proper positioning of the dam during the manufacturing of the pitot tube.

In a further embodiment, a pitot tube includes a tube body, at least one hole formed in the tube body, and at least one dam respectively disposed within the at least one hole. The tube defines an inlet, and each dam has a respective dam body that includes a notch having a substantially planar back that faces, and that is substantially parallel with, the inlet, where at least a portion of the notch is disposed inside of the tube body. Such a pitot tube can prevent ice buildup that may otherwise render the pitot tube unable to provide an accurate indication of airspeed of an object (e.g., an aircraft) onboard which the pitot tube is installed.

In yet another embodiment, a method for forming a pitot tube includes inserting a dam into a hole in a side of a pitot-tube body having a front opening such that a head of the dam is located outside of the pitot-tube body and a body of the dam is located inside of the pitot-tube body. The method further includes positioning the dam by causing a substantially planar side of the head to be substantially parallel with the front opening of the pitot-tube body. Such a method can allow positioning the least one dam in a position determined to be best for preventing the accumulation of ice inside the pitot-tube body, where such ice accumulation might otherwise render the pitot tube unable to provide an accurate indication of airspeed of an object (e.g., an aircraft) on which the pitot tube is installed.

BRIEF DESCRIPTION OF THE DRAWINGS

FIGS. 6A-6D are views of the pitot tube of FIG. 2 at respective stages of the pitot tube's manufacture, according to an embodiment.

DETAILED DESCRIPTION

Each value, quantity, or attribute herein preceded by "substantially," "approximately," "about," a form or derivative thereof, or a similar term, encompasses a range that includes the value, quantity, or attribute ±20% of the value, quantity, or attribute, or a range that includes ±20% of a maximum difference from the value, quantity, or attribute. For example, "two planes are substantially parallel to one another" encompasses an angle $-18°\le\alpha\le+18°$ between by the two planes ($|90°|$ is the maximum angular difference between the two planes, ±20% of $|90°|$ is ±18°, and the two planes are parallel to one another when $\alpha=0°$). Similarly, "a substantially planar surface" encompasses an angle $-18°\le\phi\le+18°$ formed by a plane that bisects the surface and any arbitrary tangent to any point of the surface.

A pitot probe (hereinafter "pitot tube") onboard a moving object is configured to provide information from which a speed determiner can calculate the airspeed of the object, where the speed determiner can include, e.g., a mechanical assembly, a microprocessor, a microcontroller, an electronic navigation system, or other electronic circuitry.

Where the moving object is an aircraft or other vehicle that is flying in freezing conditions (e.g., a snowstorm, an ice storm, or at high altitude), ice can form, and build up, within the pitot tube.

Unfortunately, such an ice buildup and can cause the pitot tube to malfunction by rendering the pitot tube unable to provide information sufficient for a speed determiner to calculate and indicate the object's airspeed accurately.

The lack of an accurate indication of an object's airspeed can result in serious, or disastrous, consequences. For example, without an accurate indication of airspeed, a pilot or navigation system may be unable to recognize when an aircraft is in a stall, and, therefore, may not take corrective action to pull the aircraft out of the stall. And if the stall remains uncorrected for a long-enough period of time, the aircraft may crash.

Therefore, a need has arisen for a pitot tube that is configured to prevent ice from accumulating to a degree at which the ice causes the pitot tube to malfunction.

Figure 1:
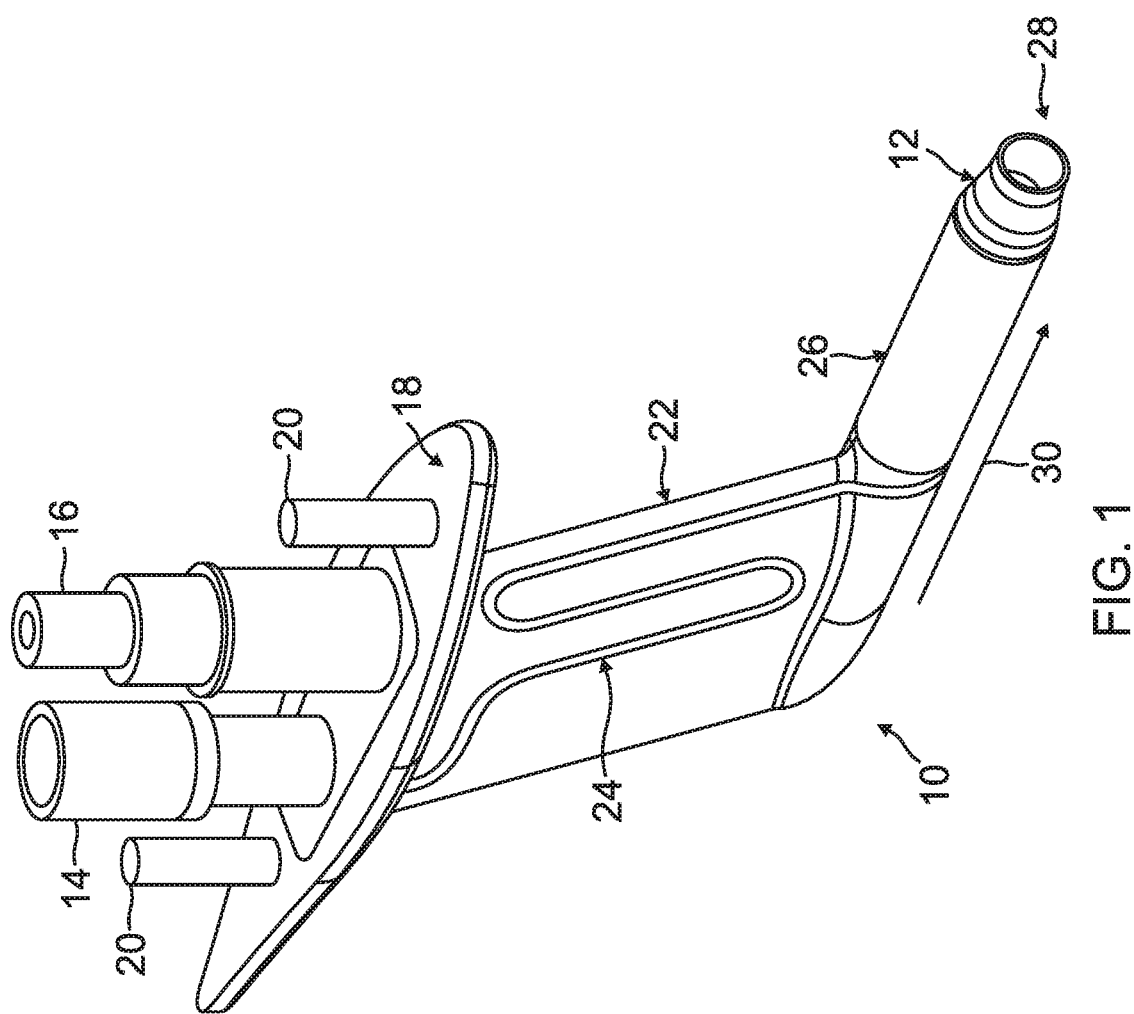
FIG. 1 is an isometric view of a pitot-tube assembly, according to an embodiment.

FIG. 1 is an isometric view of a pitot-tube assembly 10, which includes a pitot tube 12, according to an embodiment. As described below, the pitot tube 12 is configured to prevent an ice-induced malfunction. Furthermore, although the pitot-tube assembly 10 is hereinafter described as being configured for attachment to an aircraft, or as being attached to an aircraft, the pitot-tube assembly can be configured for attachment to, and can be attached to, any object having a speed determiner that is configured to calculate the speed at which the object is traveling through a fluid relative to the fluid.

In addition to the pitot tube 12, the pitot-tube assembly 10 includes an electrical connector 14, a fluid connector 16, a flange 18, fasteners 20, a strut 22, a heating coil 24, and a pitot-tube cover 26.

The pitot tube 12 includes a front opening, hereinafter an inlet, 28.

The electrical connector 14 is configured to electrically couple the heating coil 24 to a heating-coil controller onboard an aircraft (neither the controller nor the aircraft is shown in FIG. 1) to which the pitot-tube assembly 10 is attached.

As further described below, the fluid connector 16 fluidly couples the pitot tube 12 to a speed determiner onboard the aircraft (neither the speed determiner nor the aircraft is shown in FIG. 1) to which the pitot-tube assembly 10 is attached.

The flange 18 and fasteners 20 are configured to secure the pitot-tube assembly 10 to the fuselage of the aircraft (neither the fuselage nor the aircraft is shown in FIG. 1). For example, the fuselage can include an opening into which the connectors 14 and 16 are configured to extend, the flange can be configured to cover the opening and a portion of the fuselage surrounding the opening, and the fasteners 20 can be configured to engage the portion of the fuselage surrounding the opening. The flange 18 can be formed from any suitable material, such as a metal or a carbon composite, and each of the fasteners 20 can be any suitable type of fastener, such as a screw, bolt, or rivet, and can be formed from any suitable material, such as a metal or a carbon composite.

The strut 22 secures the pitot tube 12 to the flange 18. For example, the strut can be attached (e.g., welded) to the flange 18, or can be formed integrally with the flange. Furthermore, the strut 22 can include a receptacle (FIG. 3) for receiving the pitot tube 12, for securing the pitot tube to the strut, and for fluidly coupling the pitot tube to the fluid connector 16. The strut 22 can be formed from any suitable material, such as a metal or a carbon composite.

The heating coil 24 extends from the electrical connector 14, along an outside wall of the strut 22, and is wrapped around the outside of the pitot tube 12 and under the pitot-tube cover 26, which holds the heating coil in place. The heating coil 24 can be formed from any suitable material, such as resistive metal wire similar to that found in the heating element of a toaster.

Still referring to FIG. 1, the operation of the pitot-tube assembly 10 is described, according to an embodiment.

As the aircraft (not shown in FIG. 1) to which the pitot-tube assembly 10 is attached travels through the air in, or parallel to, the direction indicated by the arrow 30, air flows into the inlet opening 28, through the pitot tube 12, the strut 22, and the fluid connector 16, to a speed determiner (not shown in FIG. 1) onboard the aircraft.

Because the speed determiner (not shown in FIG. 1) provides no outlet for the air that flows into the pitot tube 12, a stagnation air pressure $p_t$ (sometimes called the "total pressure" or the "pitot pressure") develops within the pitot-tube, the strut 22, and the pneumatic connector 16, and the speed determiner detects and measures this stagnant pressure.

The speed determiner also measures the static air pressure $p_s$ outside of the pitot-tube 12 and the aircraft (not shown in FIG. 1).

From the stagnation pressure $p_t$ and the static pressure $p_s$, the speed determiner, or a computer system (e.g., a navigation system) coupled to the speed determiner, can calculate, or otherwise determine, the flow velocity $\vec{u}$ of the air past the fuselage of the aircraft according to the following equation:

$$\vec{u} = \sqrt{\frac{2(p_t - p_s)}{\rho}} \quad (1)$$

where $\vec{u}$ is the flow velocity, in units of meters per second (m/s), of the air flowing past the aircraft fuselage in direction opposite to the arrow 30, $p_t$ is the stagnation pressure in units of pascals, $p_s$ is the static pressure in units of pascals, and $\rho$ is the density of the air in units of kilograms per cubic meters (kg/m$^3$).

The speed determiner, or the computer system coupled to the speed determiner, then can determine the air speed $a_s$ of the aircraft according to the following equation:

$$a_s = |\vec{u}| \quad (2)$$

where $a_s$ is the airspeed in units of m/s.

As state above, ice inside of the pitot tube 12 can hinder the development of a proper stagnation pressure within the pitot tube or at a location at which the speed determiner, or a sensor coupled to the speed determiner (neither the speed determiner nor sensor shown in FIG. 1), measures the stagnation pressure, and can thus cause the speed determiner, or the computer system coupled to the speed determiner, to yield an erroneous value of the airspeed $a_s$ of the aircraft.

But as described below in conjunction with FIGS. 2-5, the pitot tube 12 is configured to prevent ice from forming inside of the pitot tube, or is at least configured to prevent ice from forming to a degree that would give rise to an erroneous value of the airspeed $a_s$ of the aircraft.

Still referring to FIG. 1, alternate embodiments of the pitot-tube assembly 10, the operation of the pitot-tube assembly, and of the speed determiner (not shown in FIG. 1) are contemplated. For example, the speed determiner can be a mechanical speed determiner instead of an electronic speed determiner, and can be directly coupled to an airspeed gauge instead of to a computer system.

Figure 2:
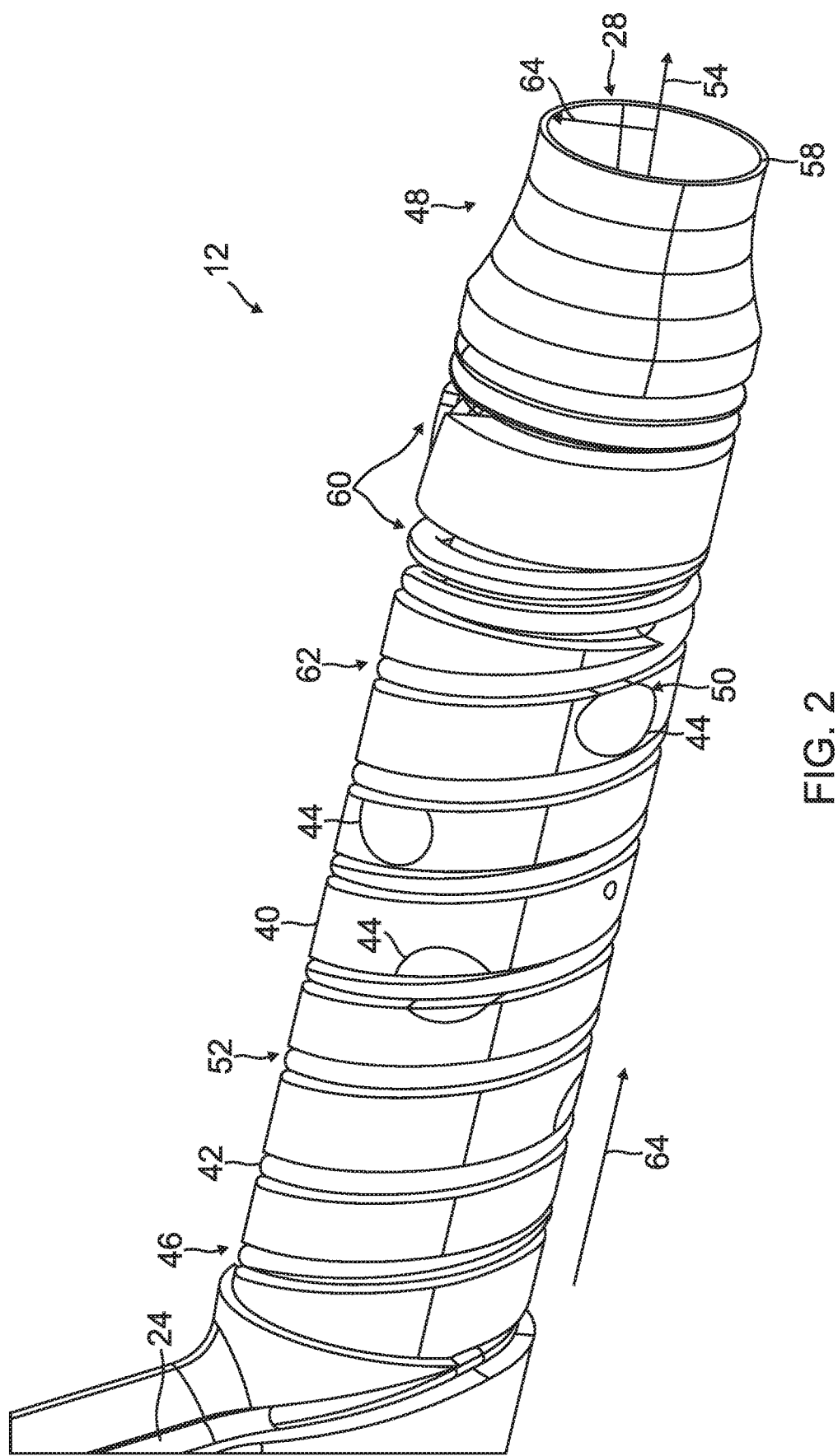
FIG. 2 is an isometric view of the pitot tube of the pitot-tube assembly of FIG. 1, according to an embodiment.

FIG. 2 is an isometric view of the pitot tube 12 of the pitot-tube assembly 10 of FIG. 1, according to an embodiment.

Figure 3:
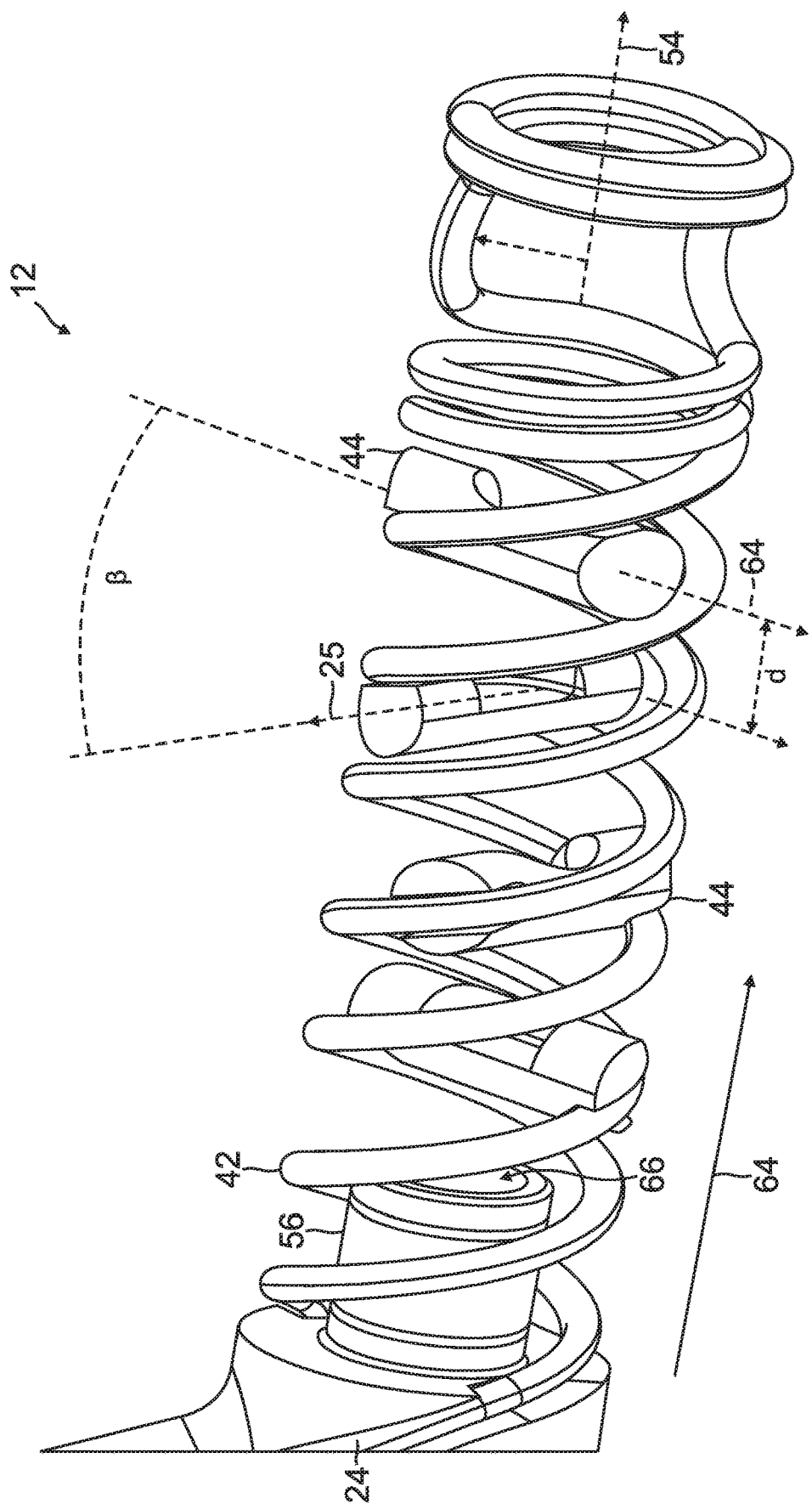
FIG. 3 is an isometric view of the pitot tube of FIG. 2 with the tube body broken away, according to an embodiment.

FIG. 3 is an isometric view of the pitot tube 12 of FIG. 2 with the tube body broken away, according to an embodiment.

Referring to FIGS. 2-3, the pitot tube 12 includes a tube body 40, a portion 42 of the heating coil 24, and ice-prevention dams 44.

The tube body 40 includes a rear end 46, a tapered front end 48, dam holes 50, a heating-coil groove 52, and a longitudinal axis 54. The rear end 46 is configured for fluid coupling to a strut connector 56, and the front end 48 defines the inlet 28, which is substantially circular, and which has a front edge 58, which lies substantially in a plane that is substantially perpendicular to the axis 54. Each of the dam holes 50 is configured to receive and to hold a respective one of the dams 44. The heating-coil groove 52 includes coil-anchor portions 60 and a spiral portion 62 configured to receive the portion 42 of the heating coil 24; the spiral portion intersects at least one of the dam holes 50 such that the portion 42 of the heating coil contacts at least the one dam 44 disposed in the at least one intersected dam hole. The tube body 40 can be formed from any suitable material, such as a metal or a carbon composite.

The dams 44 are each disposed along a respective tube-body radius 64, which extends from, and is perpendicular too, the axis 54. Furthermore, the length of each dam 44 is such that it extends through one dam hole 50 in one side of the tube body 40 and through another dam hole in another side of the tube body. And other dimensions (e.g., diameter) of each dam 44 can have any suitable values. Moreover, each dam 44 is offset from the next dam in a radial dimension by an angle $\beta$, which can be, for example, in an approximate range of $5° \leq \beta \leq 90°$, where $\beta$ is measured in a two-dimensional projection of the dams 40 onto the plane in which the front edge 58 of the inlet 28 substantially lies. Therefore, in this two-dimensional projection, the dams 40 would completely fill the front edge of the inlet. But because the dams 40 are spaced apart on center along the axis 54 by a distance (pitch) d, which can be, for example, in an approximate range of D≤d≤(Probe length/2), the dams allow air to flow into the tube body 40, and, therefore, allow development of an accurate stagnation pressure within the tube body. In addition, although the pitot tube 12 of FIGS. 2-3 is shown including four dams 44, it is contemplated that the pitot tube can include more, or fewer, than four dams. Furthermore, each dam 44 can be formed from any suitable material, such as a metal or a carbon composite.

Still referring to FIGS. 2-3, the operation of the pitot tube 12 is described, according to an embodiment.

As the aircraft (not shown in FIGS. 2-3) to which the pitot tube 12 is attached flies in, or parallel to, a direction given by the arrow 64, as described above in conjunction with FIG. 1, air enters into the pitot tube and develops a stagnation pressure.

If the air includes ice crystals, water droplets, or water vapor, then some of these ice crystals, these water droplets, or this water vapor can enter the tube body 40 via the inlet 28.

Without the dams 44, over time the ice crystals can accumulate, the water droplets can freeze, and the water vapor can condense and freeze; therefore, the ice crystals, water droplets, and water vapor can cause ice to accumulate in, and around, an opening 66 of the strut connector 56.

If the ice crystals, water droplets, or water vapor continues to enter into the tube body 40, and the ice continues to accumulate, eventually the ice can clog, block, or otherwise obstruct the opening 66 partially or fully.

Unfortunately, a partial or complete obstruction of the opening 66 of the strut connector 56 can alter the stagnation pressure that propagates through the strut 24 and the connector 16 (FIG. 1) to the speed determiner (not shown in FIGS. 2-3) onboard the aircraft, and, therefore, can cause the speed determiner to calculate an erroneous value for the airspeed of the aircraft, or even can render the speed determiner unable to calculate an airspeed value.

But the dams 44 are configured to intercept ice crystals, water droplets, and water vapor that enter into the tube body 40, and are, therefore, configured to prevent the formation and the accumulation of ice in and around the opening 66 of the strut connector 56.

Circuitry onboard the aircraft drives an electrical current through the connector 14 and the heating coil 24, which current causes the heating coil to become warmer.

The portion 42 of the heating coil 24 heats the tube body 40 and the dams 44 to a temperature t, which is equal to, or above, the freezing temperature of water; for example, t can be in an approximate range of $0°\ C. \le t \le 1000°\ C.$ Because the dams 44 effectively cover the opening 66 of the strut connector 56 in a two-dimensional projection as described above, ice crystals that enter the tube body 40 come into contact with at least one of the dams or with an inner wall of the tube body, and, due to the heat that the tube body and dams conduct from the portion 42 of the heating coil 24, these ice crystals melt shortly after such contact. And water droplets and water vapor also come into contact with at least one of the dams 44 or with the inner wall of the tube body 40, and the heat that the tube body and dams conduct from the portion 42 of the heating coil 24 prevents the water droplets and water vapor from freezing into ice.

After a period of time, the water from the melted ice, the water droplets, and the water vapor may accumulate to a point at which water drips downward from one or more of the dams 44 onto a bottom portion the inner wall of the tube body 40, and drips or streams (along the inner wall of the tube body) downward from a top portion or a side portion of the inner wall to the bottom portion.

The dripping water from one or more of the dams 44 and the dripping/streaming water from the top portion and side portion of the inner wall of the tube body 40 pool at the bottom portion of the inner wall of the tube body, and the pooled water drains from the tube body via the inlet 28.

This melting, dripping/streaming, accumulating, and draining process continues for as long as the portion 42 of the heating coil 24 conducts a current and generates heat, and as long as ice or water, in some form, enters the tube body 40 via the inlet 28.

Still referring to FIGS. 2-3, alternate embodiments of the pitot tube 12 are contemplated. For example, the length of each dam 44 can be such that the dam does not extend all the way to an opposite portion of an inner wall of the tube body. That is, the length of the portion of each dam inside of the tube body 40 can be longer than an inner radius of the tube body, but can be shorter than an inner diameter of the tube body. Or, the length of each dam 44 inside of the tube body 40 can be shorter than an inner radius of the tube body such that a two-dimensional projection of the dams onto a plane that substantially includes the front end 48 of the inlet opening 28 would have an effective opening (e.g., approximately circular) with the input axis 54 at its center. Furthermore, the groove 52, and thus the portion 42 of the heating coil 24, may not intersect any of the dams 44; but the heat from the heating coil would transfer to the dams via the tube body 40 such that the dams still would operate to prevent complete or partial obstruction of the opening 66 of the strut connector 56 as described above. Moreover, the ranges for β, d, and t can be different than the respective ranges described above for these quantities.

Figure 4:
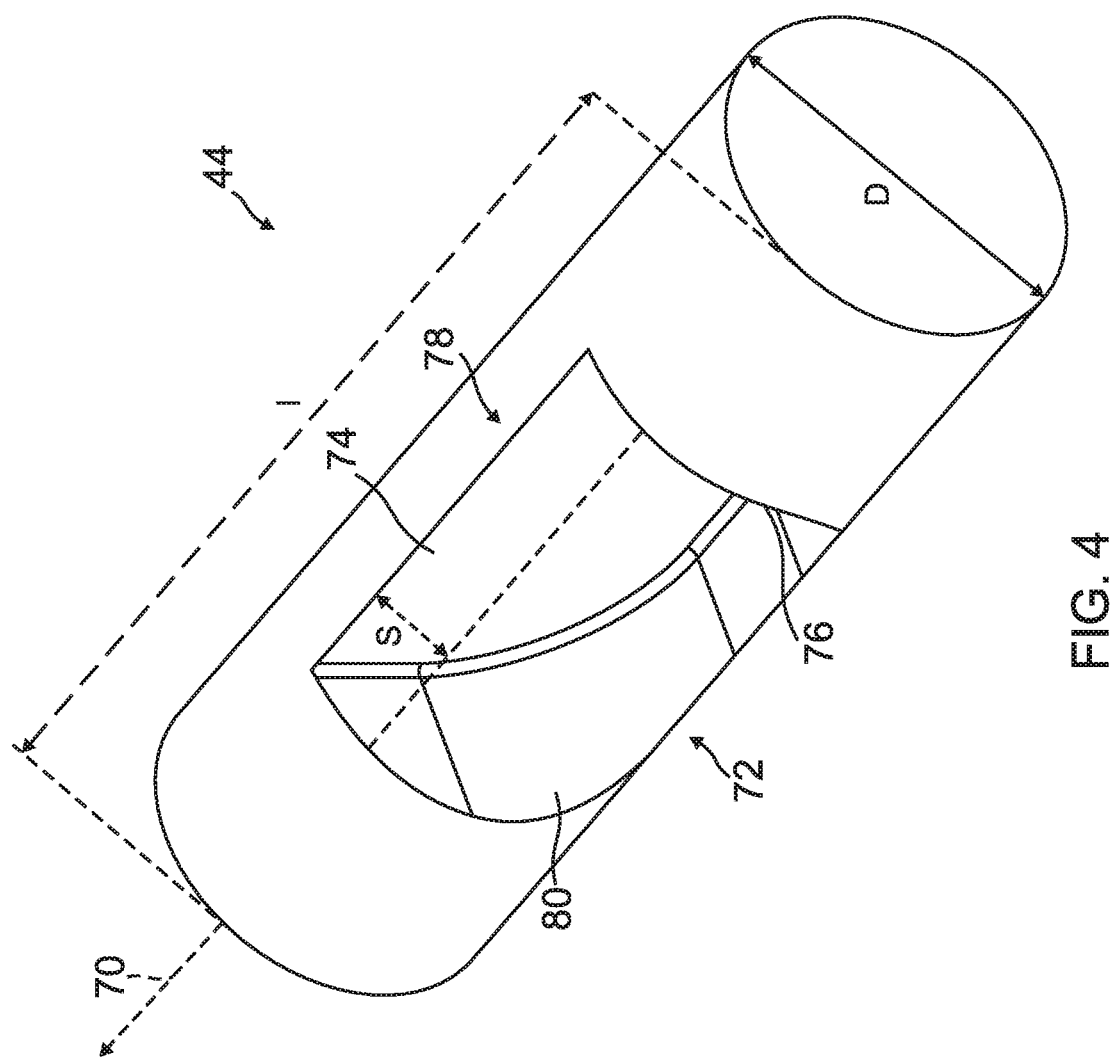
FIG. 4 is an isometric view of one of the dams of the pitot tube of FIGS. 2-3, according to an embodiment.

FIG. 4 is an isometric view of a dam 44 of FIGS. 2-3, according to an embodiment.

The dam 44 is cylindrical, has a length l, which can be in an approximate range of $l_n \le l \le l_2$, a diameter D, which can be in an approximate range of $l_n/2 \le D \le D_h$, a longitudinal axis 70, and includes a notch 72 having a substantially planar back 74, a substantially planar end 76, an open side 78, a curved portion 80, and any suitable dimensions. The back 74 is offset from the axis 70 by a distance s, which can be in an approximate range of $0.0\ inch \le s \le D/2$.

It has been discovered that the dam 44 operates at peak ice-preventing performance if the back 74 faces, and is parallel to, the front edge 58 of the pitot tube 12 (FIGS. 2-3).

Alternate embodiments of the dam 44 are contemplated. For example, the dam 44 can have a shape (e.g., a square cross section) other than cylindrical. Furthermore, the notch 72 can have any suitable shape and dimensions, and the back 74 need not be substantially planar. Moreover, the dam 44 can have more or fewer than one notch 72.

Still referring to FIG. 4, during manufacture of the pitot tube 12 (FIGS. 2-3) after the dam 44 is fully inserted into one or more corresponding dam holes 50 (FIGS. 2-3), it can be difficult for a human assembler or a machine assembler to determine a positon of the back 74 of the notch 72 relative to the front edge 58 of the pitot tube 12. For example, it can be difficult for a human assembler or a machine assembler to determine whether the back 74 is substantially parallel to the front edge 58 after the dam 44 is installed in the corresponding dam hole(s) 50.

Figure 5:
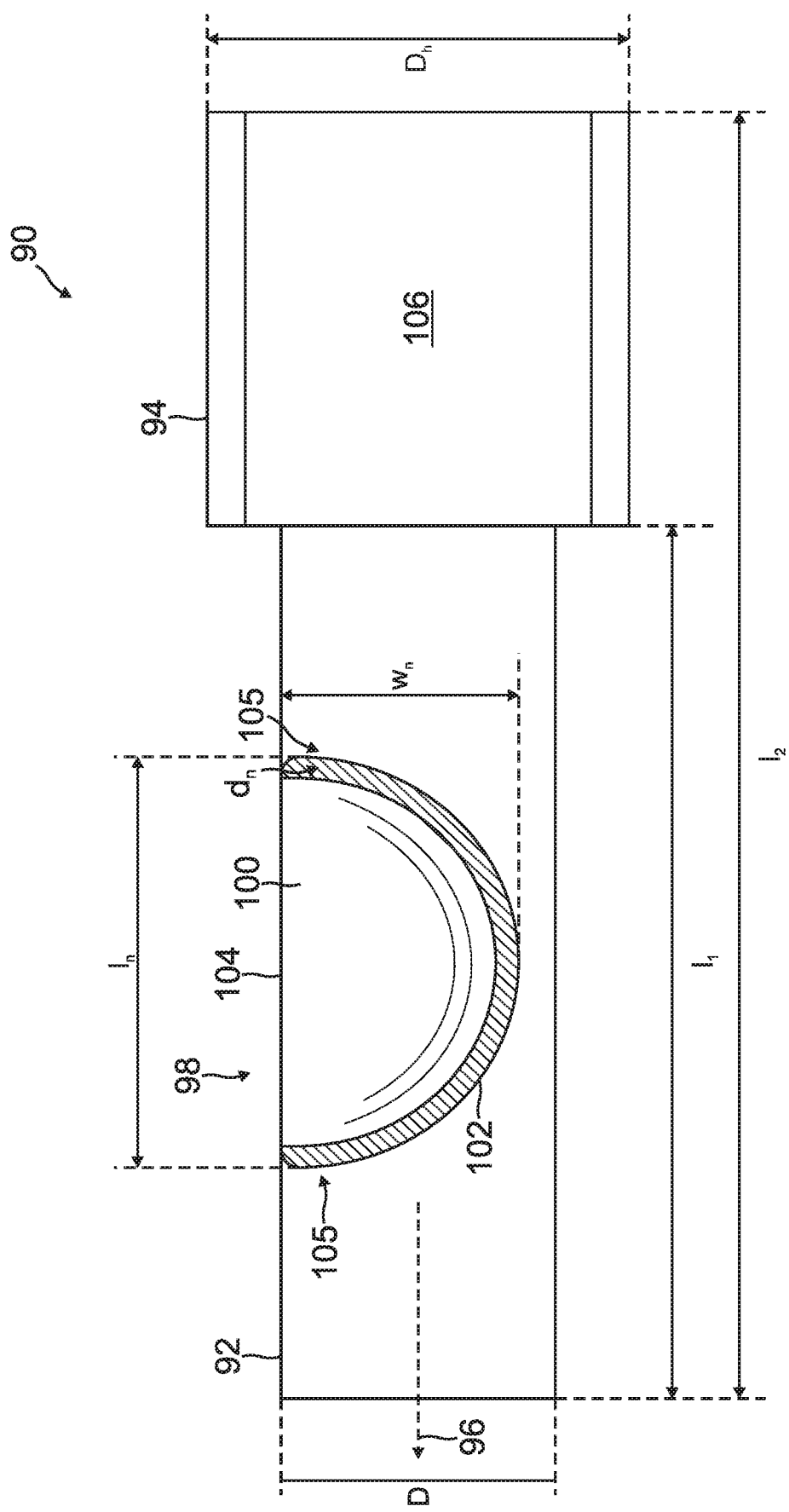
FIG. 5 is a front view of a dam for use with the pitot tube of FIGS. 2-3, according to another embodiment.

FIG. 5 is an isometric view of a dam 90, which is configured to replace one or more of the dams 44 in the pitot tube 12 of FIGS. 2-3, and which is configured to allow a human assembler or a machine assembler to position an installed dam in a particular orientation relative to the front edge 58 of the pitot tube 12, according to an embodiment.

The dam 90 has a cylindrical dam body 92, a dam head 94, a body length $l_1$, which can be in an approximate range of $0.51\ inches \le l_1 \le 0.53\ inches$, a total length, $l_2$, which can be in an approximate range of $0.76\ inches \le l_2 \le 0.78\ inches$, a body diameter D, which is sized to fit in a dam hole 50 (FIGS. 2-3) and which can be in an approximate range of $0.159\ inches \le D \le 0.161\ inches$, a head diameter $D_h$, which is wider than a diameter of a dam hole 50 (FIGS. 2-3) and which can be in an approximate range of 0.249 inches≤$D_h$≤0.251 inches, and a longitudinal axis 96.

The dam body 92 includes a notch 98 having a substantially planar back 100, a curved side 102, and an open side 104. The notch 98 is substantially centered lengthwise within the dam body 92, and has a length $l_n$, which can be in an approximate range of 0.23 inches≤$l_n$≤0.25 inches, a width $w_n$, which can be in an approximate range of 0.135 inches≤$w_n$≤0.145 inches, and a depth $d_n$, which can be in an approximate range of 0.075 inches≤$d_n$≤0.085 inches. The curved side 102 can be circular such that the notch 98 has a semi-circular shape, and curved side can be offset from the open side 104 by substantially planar wall portions 105.

The dam head 94 is cylindrical but for a substantially planar side 106, which is substantially parallel with the planar back 100 of the notch 98.

As with the dams 44 of FIGS. 2-4, it has been discovered that the dam 94 operates at peak performance to prevent an ice obstruction if the back 100 faces, and is parallel to, the front edge 58 of the pitot tube 12 (FIGS. 2-3).

Because the head 94 is too large to fit within a dam hole 50 (FIGS. 2-3), after an assembler installs the dam body 92 in the dam hole(s), the assembler can rotate the dam 90, via the head, as needed until the side 106 is substantially parallel with the front edge 58 of the pitot tube 12 (FIGS. 2-3). Because the side 106 is substantially parallel with the back 100 of the notch 98, the assembler "knows" that if the side 106 is substantially parallel with the front edge 58 of the pitot tube 12, then the back 100 of the notch 98 is also substantially parallel with the front edge of the pitot tube.

After the assembler positions the side 106 of the head 94 to be substantially parallel with the front edge 58 of the pitot tube 12 (or to be in any other desired or specified position), the assembler removes the head via conventional means such as grinding, cutting, hammering, or chiseling.

Alternate embodiments of the dam 90 are contemplated. For example, the dam 90 can have a shape (e.g., square cross section) other than cylindrical. Furthermore, the notch 98 can have any suitable shape and dimensions, and the back 100 need not be substantially planar. Moreover, the dam 90 can have more or fewer than one notch 98. In addition, the dam head 94 can include any structure or marking other than, or in addition to, the side 106 for facilitating alignment of the back 100 of the notch 98. Or the dam 90 can omit the head 94, and can include any structure (e.g., a notch in an end of the dam configured to receive a screw-driver-like tool) or marking for facilitating alignment of the back 100 of the notch 98. Furthermore, the proper, or other desired, alignment of the back 100 of the notch 98 can be other than the back 100 being substantially parallel to the front edge 58 of the pitot tube 12.

FIGS. 6A-6D are respective views of the pitot tube 12 of FIGS. 2-3 at respective stages of the pitot tube's manufacture, according to an embodiment. Although the pitot tube 12 is described as being manufactured using dams 90 of FIG. 5, the pitot tube can be manufactured using dams (such as the dams 44 of FIGS. 2-4) of different designs and types.

Referring to FIGS. 6A-6B, a solid bar or rod 120 is conventionally hollowed out and machined to form the pitot-tube body 40 having the tapered front end 48, the dam holes 50, and the heating-coil anchor portions 60.

Referring to FIG. 6C, the dams 90 are inserted into the dam holes 50, and the heads 94 are turned such that their substantially planar surfaces 106 are each substantially parallel to the front edge 58 of the tapered front end 48. As discussed above, the planar surface 106 of a dam head 94 being substantially parallel to the front edge 58 indicates that the back 100 of the dam notch 98 (FIG. 5) is facing, and is substantially parallel with, the front edge. Also as discussed above, this position of the dams 90 is desired because it renders the dams best able to prevent ice from accumulating and obstructing the opening 66 of the strut connector 56 (FIG. 3). Furthermore, although in this embodiment each dam 90 is long enough so that it extends through one dam hole 50, through the center of the tube body 40, and out another dam hole 50, one or more of the dams can have different lengths as described above in conjunction with FIG. 5.

Still referring to FIG. 6C, the dams are press-fitted or brazed into the dam holes 50, and the heads 94 (and any portions of the dam bodies 92 extending through respective dam holes opposite to the heads) are removed such that the exposed ends of the dam bodies 92 are substantially flush with the outer surface of the tube body 40.

Referring to FIG. 6D, the spiral portion 62 of the heating-coil groove 52 is formed in the outer surface of the tube both 40.

Next, the portion 42 of the heating coil 24 (FIGS. 2-3) is installed in the groove 52, and the cover 26 (FIG. 1) is installed over the heating coil and the tube body 40.

Still referring to FIGS. 6A-6D, alternate embodiments of the described pitot-tube manufacturing process are contemplated. For example, the spiral portion 62 of the heating-coil groove 52 can be formed before the heads 94 of the dams 90 are removed.

Figure 7:
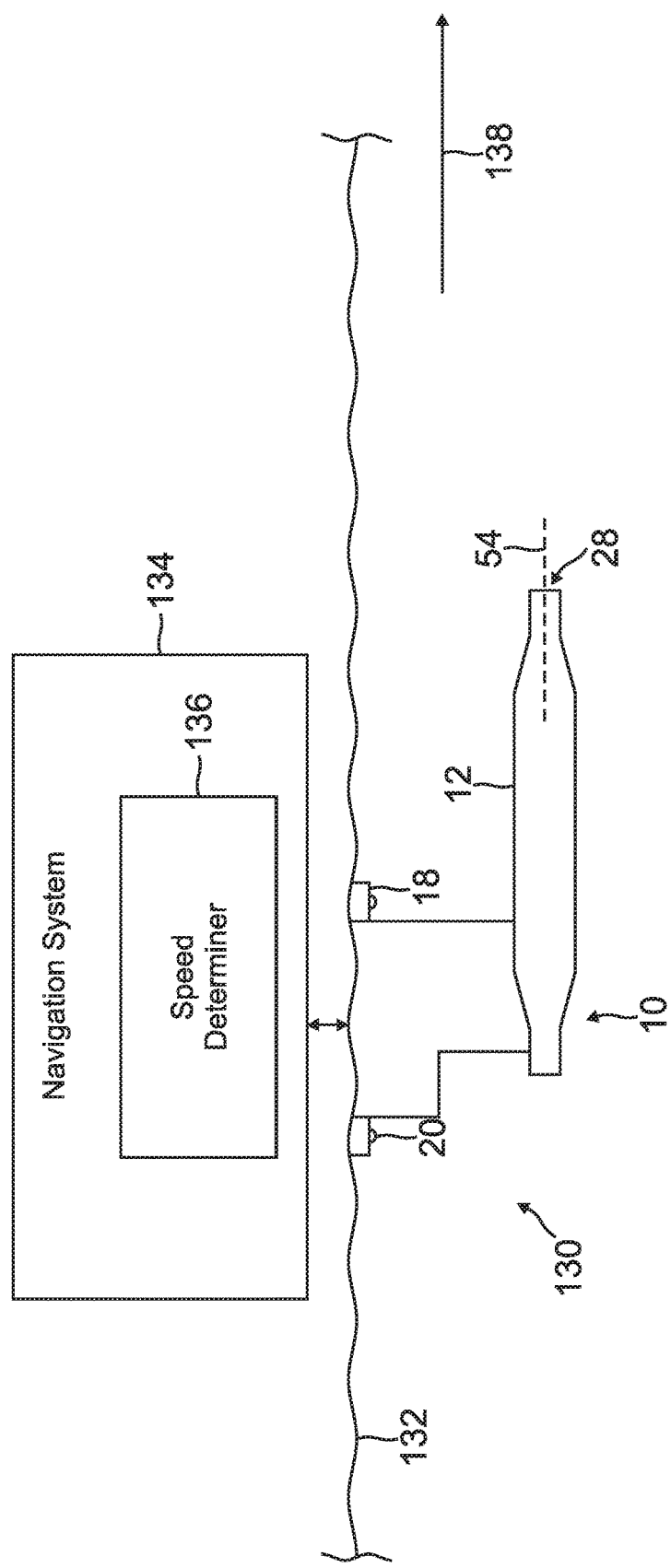
FIG. 7 is a partial view of an aircraft onboard which the pitot-tube assembly of FIG. 1 is installed, according to an embodiment.

FIG. 7 is a partial side view of an aircraft 130, on which the pitot-tube assembly 10 of FIG. 1 is installed, according to an embodiment.

In addition to the pitot-tube assembly 10, the aircraft 130 includes a fuselage 132, a navigation system 134, and a speed determiner 136, which can be a part of, or separate from, the navigation system. And the aircraft 130 is configured to fly in, or parallel to, the direction indicated by the arrow 138.

The flange 18 of the pitot-tube assembly 10 is secured to the fuselage 132 via the fasteners 20 such that the longitudinal axis 54 of the pitot tube 12 is substantially collinear with, or is substantially parallel to, the direction (indicated by the arrow 138) in which the aircraft 130 flies. Furthermore, the pneumatic connector 16 (FIG. 1) of the pitot-tube assembly 10 extends through an opening in the fuselage 132 and is coupled to a corresponding pneumatic connector (not shown in FIG. 7) of the speed determiner 136, and the electrical connector 14 (FIG. 1) extends through an opening of the fuselage and is coupled to a corresponding electrical connector (not shown in FIG. 7) of the speed determiner, the navigation system 134, or another suitable system (e.g., heating-coil control circuitry) onboard the aircraft 130.

The fuselage 132 can have any suitable shape, and can be made from any suitable material such as a metal (e.g., aluminum) or a carbon composite.

The navigation system 134 can be configured to assist a pilot and co-pilot (not shown in FIG. 7) in flying the aircraft 134 in a manual-pilot mode, and can be configured to fly the aircraft in an automatic-pilot mode. For example, the navigation system 134 can include sensors (not shown in FIG. 7) that are configured to sense flight parameters such as altitude, air speed, ground speed, heading, aircraft pitch, roll, and yaw, outside temperature, and engine thrust, and can include an instrument panel with analog gauges, digital screens, or heads-up displays to display one or more of such flight parameters. Furthermore, the navigation system 134 can include navigation circuitry that is configured to receive on or more input signals from each such sensor, to calculate, or otherwise determine, the respective flight parameters in response to the received signals, to generate output signals representative of the determined flight parameters, and to provide the output signals to the instrument panel. And the navigation circuitry can include one or more of, e.g., instruction-executing control circuitry (e.g., a microprocessor, a microcontroller), analog circuitry, digital circuitry, logic circuitry, and data-configurable circuitry (e.g., a field-programmable gate array (FPGA)).

The speed determiner 136 includes speed-determining circuitry or a speed-determining mechanical assembly that is configured to determine the air speed of the aircraft 130 according to equations (1) and (2) above in response to the stagnation pressure provided by the pitot-tube assembly 10 via the fluid connector 16 and the static pressure outside of the aircraft (the speed determiner can be configured to receive the static pressure via a sensor or fluid pathway that is part of, or separate from, the pitot-tube assembly). If the speed determiner 136 includes speed-determining circuitry, then such circuitry can include one or more of, e.g., instruction-executing control circuitry (e.g., a microprocessor, a microcontroller), analog circuitry, digital circuitry, logic circuitry, and data-configurable circuitry (e.g., a field-programmable gate array (FPGA)).

Still referring to FIG. 7, the operation of the pitot-tube assembly 10, the navigation system 134, and the speed determiner 136 is described below, according to an embodiment.

As the aircraft 130 is flying in, or parallel to, the direction indicated by the arrow 138, air enters the inlet 28 of the pitot tube 12, and, therefore, forms a stagnation pressure within the pitot tube.

This stagnation pressure is fluidly communicated to the speed determiner 136 via the pneumatic connector 16 (FIG. 1).

The speed determiner 136 also receives a static pressure of the air outside of the fuselage 132, and, in response to the received stagnation and static pressures, calculates the airspeed of the aircraft 130 per equations (1) and (2) as described above in conjunction with FIG. 1.

If the speed determiner 136 includes a gauge or other display, then the speed determiner controls the gauge or other display to display the calculated airspeed.

The speed determiner 136 also provides a signal indicative of the calculated airspeed to the navigation system 134.

If the speed determiner 136 does not include a gauge or other display, then the navigation system 134 controls a gauge or other display to display the calculated airspeed.

Furthermore, the navigation system 134 uses the calculated airspeed to assist a pilot and co-pilot in flying the aircraft 130 during a manual-pilot mode of operation, and uses the calculated airspeed to fly the aircraft during an auto-pilot mode of operation. For example, during a manual-pilot mode, the navigation system 134 determines, in response to the calculated airspeed, whether the aircraft 130 is in a stall; if the navigation system determines that the aircraft is in a stall, then the navigation system sounds an alarm that indicates to the pilot and the co-pilot that corrective action (e.g., reducing the angle of climb) is needed to take the aircraft out of the stall. And, for example, during an auto-pilot mode, the navigation system 134 monitors the calculated airspeed, and controls, e.g., engine thrust and climb angle, to keep the aircraft 130 from stalling.

Still referring to FIG. 7, alternate embodiments are contemplated. For example, the pitot-tube assembly 10 can be installed on a vehicle other than an aircraft, and can be designed for use in fluids other than air.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated. Moreover, the electronic components and circuitry described above may be disposed on a single or multiple IC dies to form one or more ICs, these one or more ICs may be coupled to one or more other ICs. In addition, any described electronic component, electronic circuitry, or electronic operation may be implemented/performed in hardware, software, firmware, or a combination of any two or more of hardware, software, and firmware. Furthermore, one or more components of a described apparatus or system may have been omitted from the description for clarity or another reason. Moreover, one or more components of a described apparatus or system that have been included in the description may be omitted from the apparatus or system. Similarly, one or more steps of a described method may have been omitted from the description for clarity or another reason, and one or more steps of a described method that have been included in the description may be omitted from the method.

What is claimed is:

1. A pitot tube, comprising:
a pitot-tube body defining an inlet and having at least one inner diameter;
at least one hole formed in the pitot-tube body; and
at least one dam each having a respective dam body that has a respective portion disposed inside of a respective one of the at least one hole, and that has a respective other portion disposed inside of the pitot-tube body, the respective other portion having at least one width each perpendicular to a longitudinal axis of the respective dam, none of the at least one width being greater than any of the at least one inner diameter of the pitot-tube body, the respective dam body including a respective notch having a substantially planar back that faces, and that is substantially parallel to, the inlet, at least a portion of the respective notch disposed inside of the tube body.

2. The pitot tube of claim 1 wherein the pitot-tube body is substantially cylindrical.

3. The pitot tube of claim 1, further comprising:
wherein the pitot-tube body includes an outer surface; and
a groove formed in the outer surface of the pitot-tube body and intersecting at least one of the at least one dam.

4. The pitot tube of claim 1, further comprising:
wherein the pitot-tube body includes an outer surface;
a groove formed in the outer surface of the pitot-tube body; and
a heating coil disposed in the groove.

5. The pitot tube of claim 1, further comprising:
wherein the pitot-tube body includes an outer surface;
a groove formed in the outer surface of the pitot-tube body and intersecting at least one of the at least one dam; and
a heating coil disposed in the groove and contacting the at least one of the at least one dam.

6. The pitot tube of claim 1 wherein the notch of at least one of the at least one dam is entirely disposed inside of the pitot-tube body.

7. A pitot-tube assembly, comprising:
a flange configured for coupling to an aircraft and having an aircraft-facing side and an opposite side;

a pitot-tube connector extending from the aircraft-facing side of the flange and configured for coupling to a speed determiner of an object;

a strut extending from the opposite side of the flange; and a pitot tube, including a tube body extending from the strut and having a front edge that defines an inlet, having an outlet in fluid communication with the pitot-tube connector, and having an outer surface, at least one hole formed in the tube body, at least one dam respectively disposed within the at least one hole, each dam having a respective dam body that includes a notch at least partially disposed within the tube body and having a substantially planar back that faces, and that is substantially parallel to, the front edge, a groove formed in the outer surface of the tube body, and a heating coil disposed in the groove.

8. The pitot-tube assembly of claim 7, further comprising a cover disposed over the outer surface of the tube body and over the heating coil.

9. The pitot-tube assembly of claim 7 wherein the pitot-tube connector includes a fluid connecter.

10. The pitot-tube assembly of claim 7 wherein the object includes an aircraft.

11. An aircraft, comprising:

a speed determiner having a first pitot-tube connector;

a fuselage having an opening; and a pitot-tube assembly, comprising a flange coupled to the fuselage over the opening, a second pitot-tube connector extending from the flange and toward the opening, and coupled to the first pitot-tube connector, a strut extending from the flange and away from the fuselage, and a pitot tube, including a tube body extending from the strut and having a front edge that defines an inlet, having an outlet in fluid communication with the speed determiner via the first and second pitot-tube connectors, and having an outer surface, at least one hole formed in the tube body, at least one dam respectively disposed within the at least one hole, each dam having a respective dam body that includes a notch at least partially disposed within the tube body and having a substantially planar back that faces, and that is substantially parallel to, the front edge, and a groove formed in the outer surface of the tube body, and a heating coil disposed in the groove.

12. A pitot tube, comprising:

a pitot-tube body defining an inlet;

at least one hole formed in the pitot-tube body; and at least one dam each disposed within a respective one of the at least one hole such that the dam is unrotatable within the respective one of the at least one hole, each dam having a respective dam body that includes a notch at least partially disposed within the pitot-tube body and having a substantially planar back that faces, and that is substantially parallel to, the inlet.

13. The pitot-tube assembly of claim 12 wherein at least one of the at least one dam is press-fitted within the respective one of the at least one hole.

14. The pitot-tube assembly of claim 12 wherein at least one of the at least one dam is brazed to the pitot-tube body.

15. The pitot-tube assembly of claim 12 wherein at least one of the at least one dam is attached to the pitot-tube body in a fixed orientation relative to the respective one of the at least one hole.

* * * * *